United States Patent [19]

Blomberg et al.

[11] Patent Number: 4,568,131

[45] Date of Patent: Feb. 4, 1986

[54] MODULATOR FOR HYDRAULIC BRAKES

[76] Inventors: Folke I. Blomberg, Duvstigen 4, S-181 40, Lindingo; Jan-Olov M. Holst, Skogsduvevagen 14, S-752 52, Upsala, both of Sweden

[21] Appl. No.: 666,643

[22] Filed: Oct. 30, 1984

[51] Int. Cl.⁴ .............................................. B60T 8/02
[52] U.S. Cl. .................................... 303/115; 303/61; 303/116; 303/119
[58] Field of Search ........................... 303/116, 10–12, 303/119, 115, 61–63, 68–69, 6 R, 6 A, 15, 93, 100, 20, 95–96; 188/181

[56] References Cited

U.S. PATENT DOCUMENTS

4,138,165 2/1979 Blomberg et al. .................. 303/115
4,166,657 9/1979 Blomberg et al. .................. 303/116

Primary Examiner—Douglas C. Butler
Attorney, Agent, or Firm—Daniel E. McConnell

[57] ABSTRACT

This invention is a braking force modulator for hydraulic vehicle brakes which is intended to be inserted into the braking fluid conduit between the main cylinder or the like and one or more of the wheel braking cylinders and controlled by a sensor system for performing braking force modulation. The braking force modulator comprises a piston pump unit (12) with normally open inlet and outlet valves (37, 38) adapted to be closed under the action of a solenoid device (47, 48, 49, 52) whereby the unit is conditioned to act as a piston pump. The inlet and outlet valves (37, 38) are two mutually independent units adapted to be operated individually by one solenoid device each.

18 Claims, 14 Drawing Figures

MODULATOR FOR HYDRAULIC BRAKES

FIELD AND BACKGROUND OF INVENTION

The present invention relates to a braking force modulator for insertion into hydraulic brake fluid conduits in vehicles equipped with hydraulic brakes to form, together with suitable devices for sensing the rotational state of the vehicle wheels, a complete system to prevent wheel-locking during application of braking forces which exceed the limit imposed by the momentary state of friction between a vehicle wheel and the road surface.

Basically, complete so-called "anti-lock" or "anti-skid" systems of this type operate in such a way that when the device (the wheel sensor) monitoring the state of rotation of a vehicle wheel during braking detects a tendency of the wheel to be retarded beyond a certain established limit, the modulator immediately blocks additional accumulation of hydraulic pressure in the wheel brake cylinder in question. The modulator also in some way evacuates hydraulic oil or fluid from the wheel brake cylinder so that the braking moment is reduced. The retardation of the vehicle wheel is thus reduced and and the wheel begins to accelerate. When the vehicle wheel has achieved a speed approaching the speed which a non-braked wheel would have at the actual vehicle speed, the wheel sensor may change the signal given to one which may be an order to the modulator to increase the hydraulic oil pressure or to maintain it on a constant level.

As the present invention is only concerned with a braking pressure modulator there is no reason to deal in greater detail with wheel sensors which are available in many known constructions, both mechanical and electronic, representing different control philosophies. Some of these sensors emit only two signals: either (1) to stop additional pressure accumulation and to lower the braking force, or (2) to increase the braking force. As indicated before, there are also wheel sensors which in addition to the two signals mentioned above may also signal that braking force should be maintained at a constant level.

As the present specification is concerned with a modulator for hydraulic braking systems the expressions "braking force" and "braking moment" used above are substantially synonymous with hydraulic oil or brake fluid pressure in a wheel brake cylinder, because the braking moment in a hydraulic brake essentially is directly proportional to the hydraulic pressure applied. In this specification the expression "brake fluid" ordinarily used by the experts on the field is used irrespective of the kind of hydraulic fluid actually used.

It will appear from the above considerations that a universally useful modulator, i.e. a modulator which can be used in combination with any wheel sensor known so far, must fulfill with a requirement to be able to receive and carry out four orders, namely:

1. Bar pressure accumulation in the wheel brake cylinder.
2. Reduce the pressure in the wheel brake cylinder.
3. Increase the pressure in the wheel brake cylinder.
4. Maintain the pressure in the wheel brake cylinder at a constant level.

The patent literature contains a great number of descriptions of braking modulators, some of which can only receive and respond to the first three of the above indicated orders. In addition to being complicated, sensitive to disturbances and expensive they have a common deficiency in that they are difficult to bleed. They contain solenoid valves and passageways in which air can be trapped so that it cannot be removed by the ventilating principle well-known to the experts and practised for many decades, namely simply to open a ventilating nipple on the wheel brake cylinders. Ventilating nipples must also be provided on the modulator. In certain cases an exact procedure must be followed which often requires actuation of solenoid valves during certain phases of the procedure. With bleeding procedures being extremely difficult to such systems, deficient ventilation in certain of the previously known modulators involves a direct danger due to the fact that, if the prescribed ventilating procedure is not minutely followed, air may be trapped within the modulator which does not interfere with the normal function of the brake. The mechanic or service man may have bled the brake system until the "pedal sponginess" characteristic of a brake system containing a compressible gas has been eliminated. This may mean that, when the vehicle is involved in a situation requiring the modulator to come into action, the modulator will be inoperative due to the trapped air. There are even examples of modulators which, when actuated while air is trapped in the modulator, release air into the normal braking system causing even that system to become inoperative.

Thus it is a reasonable requirement of a modulator that a system including the modulator may be bled or ventilated without requiring additional measures beyond the established procedure which simply involves an opening of the "ordinary" ventilating nipple in the wheel brake cylinder. Only two modulators are described in the patent literature which at least to some extent fulfill this requirement, namely a modulator according to Swedish Pat. No. 75 01883-8 and a modulator according to U.S. Pat. No. 4,138,165.

Briefly, these modulators may be described as a conventional piston pump, the piston of which is oscillated by means of an eccentric driven by an electric motor. The pump is provided with two spring-biased check valves, one of which serves as an inlet valve and the other as an outlet valve. Normally the check valves are held open by a spring, permitting brake fluid freely to pass through the modulator in both directions during normal braking. Disposed between the two check valves is a solenoid which, upon energization, is able to overcome the force of the spring which normally holds the two check valves open and thereby bar further increase in brake fluid pressure. When the piston-moving mechanism starts, the pump starts pumping brake fluid from the wheel cylinder back to the braking fluid pressure generator, ordinarily a foot-operated master cylinder with a piston which generally is provided with a so-called vacuum servo mechanism reinforcing the power exerted by the foot of the operator. This happens when the wheel sensor signals that brake fluid pressure in the wheel brake cylinder should be reduced. When the current supply to the solenoid magnet is interrupted, the two check valves are opened again, permitting brake fluid to flow from the master cylinder through the modulator and to the wheel brake cylinder, thus causing the pressure therein again to be increased. This happens when the wheel sensor signals that the pressure in the wheel brake cylinder should again increase. The modulator according to Swedish Pat. No. 75 01883-8 is a fundamentally simple device which obviously may be manufactured at a reasonable cost and which at first sight appears to satisfy all requirements to be met by a braking modulator for hydraulic vehicle brakes, such as the requirements regarding simple ventilation as discussed above.

However, upon closer analysis, the modualator may be found to exhibit a number of deficiencies such that it cannot satisfy the requirements which a braking modulator must meet in order to be acceptable at this time. These include:

(1) System bleeding or ventilation is not entirely free of problems as previously indicated by the choice of the words "at least to some extent fulfill this requirement". Due to the fact that the two check valves are opened and closed by one solenoid device, a valve chamber must be provided which is connected to the space above the pump piston by means of a duct. When bleeding is performed, brake fluid mixed with air bubbles flows through the valve chamber but not through the space above the piston, which thus will have to be ventilated by means of brake fluid flowing under the action of gravity downwardly through the duct connecting the two spaces. The duct must be rather wide if the air in the space above the piston is to pass upwardly through the duct to the valve chamber to be discharged therefrom during bleeding and leave the modulator. If the duct is too narrow, air bubbles may, due to the high surface tension of the brake fluid, prevent the air from leaving the space above the piston. Obviously, bleeding a system using the modulator of Swedish Pat. No. 75 01883-8 may be problematical.

(2) From Section 1 above it appears that in order to enable the modulator to be ventilated at all it must be oriented in a certain way, namely with the valve chamber disposed substantially directly above the space overlying the piston. This condition is difficult to satisfy in the narrow spaces available for mounting a modulator in modern vehicles.

(3) The duct mentioned in Section 1 and connecting the valve chamber and the space above the piston is an inconvenient dead volume which may endanger the function of the pump. Brake fluid has a considerable elasticity which, in pumps having small stroke volumes in relation to unavoidable dead volumes as is the present case, has the effect of preventing the pump from producing large pressure differentials.

(4) A single solenoid operating two check valves must be disposed between them which means that the valve forming the outlet valve of the pump and nearest the master cylinder of the braking system must be operated by the solenoid by means of a pin passing through the valve seat. The effective flow area of the valve then amounts to the difference between the cross-sectional areas of the valve seat and the operating pin. The brake fluid pressure differential operates against the cross-sectional area of this pin, but the area does not contribute to the flow area of the valve. Even if a pin is used having a diameter as small as 1.5 mm, this means, at a pressure differrential of 150 bar, a force of 27 Newton. When the valve is opened this force is a net loss and constitutes an additional requirement on the solenoid which therefore will be large and accordingly slow.

(5) As the two check valves are operated by a single solenoid, the modulator cannot receive and execute the last one of the four types of orders mentioned previously. To do so requires that the two check valves be operated independently of each other. Theoretically this order "hold the pressure in the wheel braking cylinder at a constant level" might be carried into effect by holding the solenoid energized (and thereby the check valves closed) and stopping the motor. In reality, however, this is not an operable solution because the inertia of the motor will cause the motor to continue moving for some time in spite of the fact that the current supply has been interrupted. There are established methods to shorten the deceleration time of motors subsequent to current interruption, e.g. by short-circuiting the motor causing it to switch-over to generator-action producing a braking moment. It is also possible, after having interrupted the current, to transmit a short current pulse backward through the motor in order to bring it to a standstill. The motor may also be braked by a solenoid operated spring-biased brake which is held released by the same current which is fed into the motor. This last-mentioned measure may be combined with those mentioned previously. However, these measures are not sufficient in order to produce the required short reaction times.

To bring about a quick response to wheel sensor signals, the motor preferably should be in action during the complete period of time in which the system comprising the wheel sensor and the modulator is controlling a braking sequence. The reason therefore will appear from the description of the present invention given hereinafter.

(6) The braking modulator according to Swedish Pat. No. 75 01883-8 lacks any mechanism enabling the sensor order "increase the pressure in the wheel brake cylinder" to be executed in a controlled way. When the solenoid opens the two check valves, the brake fluid pressure will be immediately increased. This produces considerable problems as far as control technique is concerned, and the system would act jerkily while the heavy applications of brake fluid pressure would expose the suspension of the vehicle to violent loads. To operate in a satisfactory way, the modulator must be complemented by means enabling the pressure increase derivate to be controlled. A number of such devices are disclosed in Swedish Pat. No. 76 05863-5.

(7) Practical tests have shown that, without interference into the normal function of the braking system, restrictions having very small open areas may be inserted into brake fluid conduits. Thus, it would be possible to give the two check valves a very small cross-sectional area which would mean low operating power requirements for the solenoid which thus could become small, economic in current consumption and quick.

This is opposed by a requirement of a considerably larger cross-sectional area for enabling the check valves to operate as efficient inlet and outlet valves during pumping.

It has been found that braking systems even for heavy passenger cars permit restrictions in the form of openings having a diameter of less than 1 mm, with 0.7 mm being common and a still lower value possible for smaller cars. A hole having a diameter of 0.7 mm has an area of 0.38 mm2.

The maximum brake fluid pressures in modern braking systems are never lower than 120 bar, 150 bar being an ordinary value and the maximum pressure in extreme cases amounting to 200 bar and more. On an area of 0.38 mm2, a pressure of 150 bar yields a force of 5.7 Newton which can be rather easily opposed by a rather small solenoid.

Opposed to this is the fact, established by practical tests, that in order for the pump to reach a good pumping effect and a reasonable efficiency, much larger valves are required. For normal passenger cars the requirement is a diameter of at least 3 mm and preferably 4 to 5 mm. A brake fluid pressure differential of 150 bar yields in valves of 3 mm diameter a force exceeding 100 Newton. It is not possible to produce this force even with reasonably large solenoids, and the problem is made more difficult by the requirement of extremely short reaction times.

From the above explanation it will appear that a person trying to construct a serviceable modulator according to Swedish Pat. No. 75 01883-8 will be forced to find a compromise between the two quite incompatible requirements explained above regarding the diameters of the check valves, which will be a difficult or almost impossible task.

The modulator according to U.S. Pat. No. 4,138,165 has the same deficiencies as those explained in Sections 1-5 in connection with the modulator according to Swedish Pat. No. 75 01883-3. Those described in Sections 6 and 7 have been eliminated in the modulator according to the United States Patent by constructing the two check valves as double valves. Such a valve comprises a relatively large valve disk in which a smaller valve is provided. When the modulator is not in action, both the large and small valves are held open. When the modulator is conditioned to obstruct continued passage of brake fluid, both the large and smaller valves are closed, and during pumping the large valves act as inlet and outlet valves.

When the brake fluid pressure is to be restored, the solenoid return spring is not able to open the two large valves due to the pressure differential across them. In contrast, the two small valves are opened and the area difference between a central hole in the large valves and an actuating pin for the small valves extending tending therethrough constitutes the restriction required for a soft, controlled re-application of the brake. When the brake fluid pressure across the modulator has been substantially completely equalized, the large valves open. It will be seen that the two deficiencies described in Sections 6 and 7 above have been at least theoretically eliminated. Sufficiently large pumping valves have been obtained as well as a controlled restriction of the brake fluid flow upon renewed application of the brake.

Attempts to develop mass produced modulators according to this United States Patent have shown that the construction comprises a large number of small, very intricate detail parts which must be manufactured at prohibitively small tolerances. In addition, the fact that a single solenoid operates both the inlet and outlet valves requires that the range of manufacturing tolerances be very carefully monitored, which in turn requires that parts made to conventional tolerances must be separated by measurement into classes for selective assembly. In assembly, it has been shown in practice that in spite of very exact manufacture of the detail parts and thorough selection-mounting the device had to be dismantled and parts exchanged several times in order to achieve proper function.

Practical tests designed to find a suitable restriction area for the brake fluid upon renewed application of the brake during a controlled braking process have shown that the restriction area should be very small. This means that the gap between the operating pin for the smal valve and the hole in the large valve will be so small that there is an obvious risk that the gap will be reduced after some time due to the collection of oxides, dirt and other deposits, causing the restriction area to be diminished and the function of the modulator to be endangered. If the restriction area becomes excessively small, the brake is re-applied so slowly that the braking distances are extended during a controlled braking process. The consequences would be completely disastrous if the gap were entirely clogged.

On the basis of the above remarks and after having studied the drawings of U.S. Pat. No. 4,138,165, the expert will realize that this patent does not form an acceptable starting point for developing a reliable and sufficiently cheap product suitable for mass production.

BRIEF DESCRIPTION OF INVENTION

It is an object of the present invention to offer solutions for all the faults and deficiencies discussed above in known braking modulators for hydraulic vehicle brakes. In realizing this object of the present invention, provision is made for separate actuation of inlet and outlet valves so as to accomodate the full range of possible operational signals as described above. Further, the actuators for the valves are arranged with the valves in an organization which facilitates bleeding of a brake system indlucing the modulator in the conventional way.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figures 1, 2, 12:
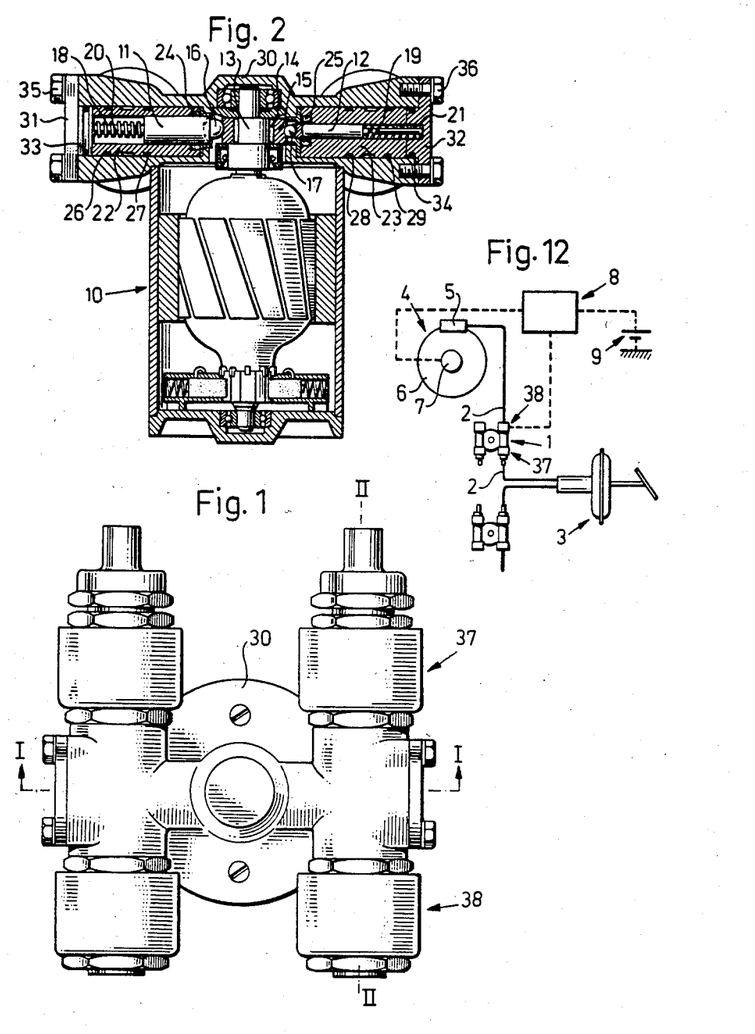
FIG. 1 is end view of a unit in accordance with a presently preferred embodiment of the invention.
FIG. 2 is a sectional view of the unit according to FIG. 1 taken along line I—I in FIG. 1.
FIG. 12 is a circuit diagram of the unit according to FIGS. 1 to 8 when inserted into a complete braking system for a wheel brake.

As shown in FIG. 12, a modulator 1 in accordance with this invention is inserted into the normal hydraulic conduit 2 in a conventional hydraulic braking system between the brake fluid pressure generator 3, shown as a conventional master cylinder with vacuum booster, and a brake 4 comprising a braking yoke with a brake cylinder 5 and a braking disk 6. The modulator 1 is a device enabling all four of the orders mentioned above to be executed, which means that it can inhibit brake fluid flow from the master cylinder 3 to the brake cylinder 5 and hold it at a constant level therein, pump brake fluid from the brake cylinder 5 toward the master cylinder 3, and permit brake fluid to flow in a controlled way from the master cylinder 3 toward the brake cylinder 5. The modulator 1 may be constructed so as to handle brakes for one or several wheels. The system also comprises a sensor device for sensing the state of rotation of a vehicle wheel and for emitting a signal to release the braking pressure applied in the initial phase of a wheel-lock. The sensor system is schematically indicated in FIG. 12 and comprises a transmitter 7, a control box 8 and a current source 9 (normally the battery of the vehicle), as well as a number of electric conductors indicated by broken lines.

Figure 9:
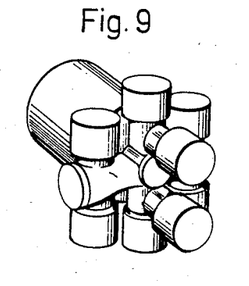
FIGS. 9 to 11 show modified arrangements of the unit according to the invention with a greater number of braking circuits than the two appearing in the unit according to FIGS. 1 to 8.
Figure 10:
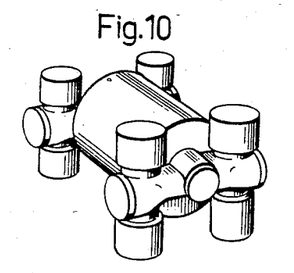

FIG. 12 represents one modulator 1 adapted to control brakes for two wheels provided that these do not comprise more than one brake cylinder. The same applies to the modulators according to FIGS. 1, 2 and 8. A vehicle having four wheels with brakes comprising one brake cylinder for each wheel thus requires, for individual control of the brakes, two modulators according to FIGS. 1, 2 and 8 or one modulator having four circuits. Examples of such modulators are shown in FIGS. 9 and 10. As shall be described hereinafter, the rear brakes on conventional passenger cars have a very small braking effect compared with the forward brakes. Accordingly, the rear brakes sometimes form a single braking circuit controlled by the same modulator circuit. In these cases one sensor system 7, 8 is often provided for each rear wheel and the sensor system, sensing the state of rotation of the wheel which at the moment is rolling over the worst road surface, is permitted also to control the brake of the other rear wheel. This control philosophy is conventionally termed "sense-low". It is also possible to let both braking circuits be controlled by one single sensor system 7, 8 the transmitter of which is driven by the cardan shaft, and which thus senses mean values for the state of rotation of both wheels. It is known that for many years the hydraulic systems for vehicle brakes for the sake of security have been subdivided into two circuits, the master cylinder 3 generally comprising a so-called tandem master cylinder. In one example of such subdivision one circuit of the tandem master cylinder comprises the forward wheel brakes and its other circuit the rear wheel brakes. In another embodiment one circuit comprises the right-side forward brake and the left-side forward brake and the right-side rear brake. Other subdivisions are possible.

Figure 11:
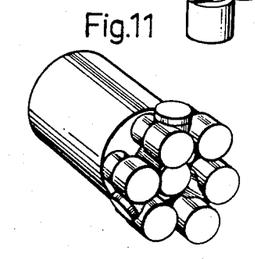

In order to achieve increased security when one of the circuits of the tandem master cylinder fails, certain vehicles are provided with wheel brakes having two brake cylinders. These brakes are ordinarily disc brakes, but also drum brakes have been provided with two brake cylinders. If a four-wheel vehicle has double brake cylinders in all the brakes, individual control of all the wheel brakes requires eight modulator circuits which means four modulators according to FIGS. 1, 2 and 8 or two modulators according to FIGS. 9 and 10. However, such arrangements are uncommon. In contrast, it is a common arrangement that the forward brakes have double brake cylinders whereas the rear brakes only have a single one. In this case six modulator circuits are required which, for example, can be achieved with the aid of two modulators according to FIG. 11, three modulators according to FIGS. 1, 2 and 8 or one modulator according any of FIG. 9 or 10 and one according to FIGS. 1, 2 and 8. In such arrangements the one brake cylinder in the forward brakes is connected to the circuit of one of the tandem master cylinders and the other brake cylinder to the other. If several modulators are used as in the above described arrangements, it will also be possible to achieve a considerable security against failure of any of the modulator motors 10.

While many arrangements different from those described here are imaginable, the expert will realize that it is possible to provide modulators according to the present invention which are suitable for every imaginable system for subdividing the hydraulic system in hydraulic vehicle brakes.

A modulator according to the present invention, in similarity to the modulators described in Swedish Pat. No. 75 01883-8 and U.S. Pat. No. 4,138,165, may be defined as a unit comprising one or several piston pumps, the pistons of which are oscillated by an eccentric driven by an electric motor and the inlet and outlet valves of which are spring-biased check valves which normally are held open but which upon actuation for reverse pumping of brake fluid from the brake cylinder 5 to the master cylinder 3 may be closed by electromagnetic means so that pumping can be performed. The modulator according to the present invention is distinguished from the modulator of the above-mentioned patents by features which are particularly important for reliable operation at high control frequencies and at a moderate current consumption as well as for mass production at reasonable cost.

However, the most essential difference exists in the check valve arrangement which is basically distinguished from the modulators according to the previously mentioned Swedish and United States Patents by the fact that in these known constructions the two check valves are operated by one single solenoid whereas the modulator according to the present invention has a solenoid for each check valve. A number of advantages are thereby obtained. As the valves do not need to be located in alignment, they may be positioned arbitrarily in relation to each other which means that a straight through-flow conduit or passageway can be formed without pockets and dead-end spaces which render ventilation difficult. It is more easily possible to achieve small and compact modulators for many braking circuits due to the separate valves. Moreover, the solenoids on both valves in the same circuit may be placed on the same side of the valve seats as the valves, which means that it is possible to avoid the dead area created by an operating pin extending through a valve seat and reduce the operating force requirements for the solenoids so that the solenoids may be smaller and thus faster. By providing two separate solenoids in place of one common solenoid for the two check valves, an additional decrease of the operating forces of the solenoid is obtained. By placing the solenoids on the same side of the valve seat, it is more easily possible to construct the valves themselves as two-step valves, whereby an additional decrease of the operating forces of the solenoids is obtained. Finally, the use of separate valves means that the reapplication device responsible for the restriction of brake fluid flow upon renewed application of the brakes after a pumping down phase can be separated from the main valves and arranged as a separate valve operated by the same solenoid as the main valves. This is a very considerable advantage as far as reliability and manufacturing ease and expense are concerned.

These and other advantages of the present invention in comparison with the previously discussed modulators according to Swedish Pat. No. 75 01883-8 and U.S. Pat. No. 4,138,165 will be additionally explained in the following detailed description of the structure and function of the modulator. The pump section (FIG. 2), defined here as the complete device with the exception of the solenoid-operated check valves, comprises an electric motor 10 on the shaft of which an eccentric 13 is provided which via a needle bearing 14, an eccentric strap 15 and balls 16, 17 causes pistons 11, 12 to oscillate. The pistons are urged inwardly against the eccentric device by springs 18, 19. As a dead-volume filler two bodies 20, 21 are inserted within springs 18, 19. The pistons move in cylinder linings 22, 23 in relation to which they are sealed as by so-called sliding-sleeve gaskets 24, 25 inserted into the cylinder linings. The sealing between the pistons 11, 12 and the cylinder linings 22, 23 may obviously also be performed by sealing elements on the pistons 11, 12 such as O-rings. The cylinder linings 22, 23 are sealed by means of O-rings 26, 27, and 28, 29 respectively in relation to the housing 30. The cylinder linings are retained in the housing 30 by means of covers 31, 32 sealed in relation to the housing 30 by means of O-rings 33, 34. The covers 31, 32 are urged against the housing 30 by screws 35, 36.

One of the differences resides in the fact that balls have been introduced between the pistons and the eccentric, whereby the frictional losses in the pumping section have been reduced endowing the pump with very high efficiency. In conventional pumps the plane ends of the pistons abut against an eccentric which has cylindrical outer surfaces. If the pump has only one piston, the movement between the piston and the eccentric is a pure rolling movement. If the pump has more than one piston, sliding movement occurs between the end surfaces of the pistons resulting in wear and great frictional losses, on the one hand, in the contact surfaces between the pistons and the eccentric and, on the other hand, between the pistons and the cylinders due to the large lateral of guiding forces acting between the pistons and the cylinders.

These drawbacks have been overcome by the construction used according to the present invention. The end of pistons 11, 12 facing the eccentric strap 15 as well as the outer surface of the eccentric strap 15 have been provided with concave, spherical grooves having a slightly greater radius than balls 16, 17 inserted into these grooves between the pistons and the eccentric. The sliding movement between the pistons and the eccentric strap 15 in this way is replaced by a pure rolling movement, and calculations confirmed by practical tests have shown that an improvement in efficiency of an order 40% has been obtained.

The pistons 11, 12 in FIG. 2 have different diameters because brakes on one and the same vehicle may have very different dimensions. On a modern passenger car the braking force or the braking moment on the forward wheels is at least three times and often four times as high as on the rear wheels. The ratio is on the order of 60% forward and 40% rear. Moreover, this difference is increased during braking by what may be called "virtual gravity center shift" or "forward tipping" so that the weight distribution, which for an unbraked vehicle may be 60% forward and 40% rear, is changed to e.g. 80% forward and 20% rear. The brakes, in consideration of these conditions, are so constructed that during energetic braking there is no risk that the rear wheels will lock before the forward wheels. As is well-known to the expert, locking of the rear wheels before the front wheels unavoidably means that the rear portion of the car is thrown in a lateral direction causing the driver suddenly to lose control of the vehicle.

This means of course that the amount of brake fluid supplied to a forward brake during braking is much greater than the amount supplied to a rear brake on one and the same passenger car.

Figure 8:
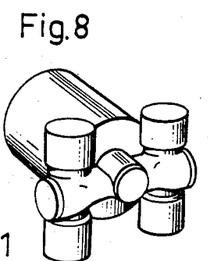
FIG. 8 is a perspective view of the unit according to FIGS. 1 to 7.

In the embodiment in which the invention is illustrated in FIGS. 1, 2 and 8, two wheel braking circuits may be controlled, the intention being that the circuit containing the larger piston 11 should control a forward wheel and the circuit containing the smaller piston 12 a rear wheel. There are reasons in addition to those indicated above for giving different diameters to the pistons in one and the same modulator. For example, it may be advantageous in certain vehicles to arrange one modulator circuit to control two or more wheel brakes and another modulator circuit to control only one wheel brake.

The solenoid valves 37, 38 (compare FIGS. 3 and 4) are identical with the exception one valve 37 has in its upper end the reapplication device for restricting the braking flow during renewed application of the brake. This device, hereafter designated as "reapplication valve", comprises an operating pin 39, a valve disk 40, a return spring 41 and a valve seat integrated in a support disk 42. The lower valve 38 is not provided with a similar device.

Figure 3:
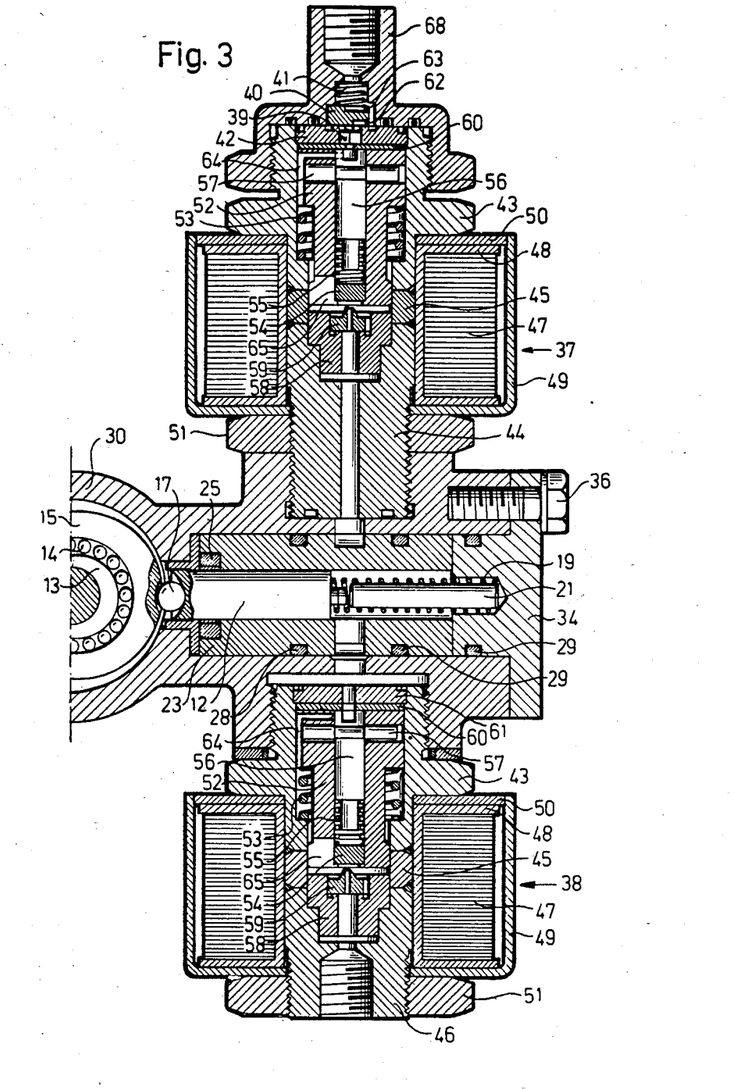
FIG. 3 is a sectional view taken along line II—II in FIG. 1 of the two solenoid valves in an apparatus according to this invention.
Figure 4:
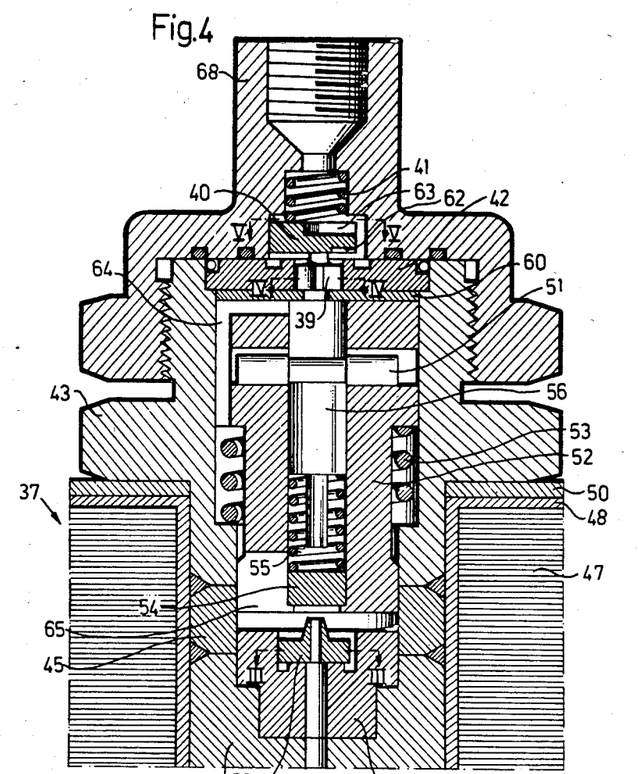
FIG. 4 shownns an enlarged portion of the upper solenoid valve of FIGS. 1 and 3.
Figure 5:
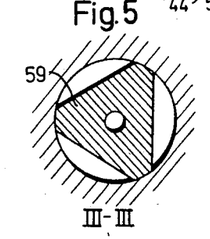
FIGS. 5 to 7 are cross-sectional views taken along lines III—III, IV—IV and V—V in FIG. 4.

The first portion of the following description refers to the two valves 37, 38 and explains the respects in which they are identical as far as construction and function are concerned. At the end of this portion of the specification the re-application valve device in valve 37, mentioned in the preceding paragraph, will be described more fully. The same reference designations are used for identical details in both valves 37, 38.

The housing of valve 37 is formed by three welded together parts 43, 44, 45. Two of the parts 43, 44 are of magnetic material, and a spacing piece 45 is of nonmagnetic material. The counterpart of part 44 in valve 37 is part 46 in valve 38. The difference between parts 44 and 46 has no functional importance being only due to the fact that one part 46 is provided with a threaded connecting hole for tube-attachment purposes whereas the other part 44 is provided with an extended outside thread for screwing insertion of the valve into the modulator housing 30. The valve housing is surrounded by a solenoid 47 wound onto a coil support 48. The solenoid is enclosed by a casing 49 having a cover disk 50, both of magnetic material, and is urged toward the valve housing by a nut 51. The valve housing encloses a movable core 52 provided with a return spring 53. In the core 52 a valve disk 54 is urged against a shoulder by means of a spring 55, the other end of which is supported by a spring support 56 which in turn is secured in the core 52 by a tap 57 passing through a hole extending across core 52. An insert 58 comprising a seat for a valve cone 59 is pressure-fitted into respectively part 44 of the valve housing for valve 37 and part 46 for valve 38.

The cores 52 are urged (see FIGS. 3 and 4) upwardly under the action of springs 53 against adjusting disks 60 which in turn are supported by a support disk 42 in valve 37 and a similar support disk 61 in valve 38. With the aid of an adjusting disk 60 of varying thickness, the stroke length of the cores may be adjusted. The two support disks 61, 42 are distinguished by the fact that the support disk 42 comprises a seat for the re-application valve 40, this seat having no counterpart in support disk 61.

The re-application valve 40, within certain limits to be explained later, follows the movements of the core 52. The re-application valve 40 is urged by a spring 41 against an operating pin 39 extending through a hole in support disk 42. The operating pin 39 is in turn urged against the core 52 via adjusting disk 60.

Figure 7:
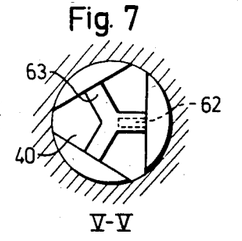

When solenoid 47 is not actuated, the re-application valve 40 is lifted off its seat in support disk 42. It is to be noted that the re-application valve 40 is provided with a groove 62 on its sealing surface facing the seat in the support disk 42 (compare FIGS. 3, 4 and 7) which permits a controlled leakage past the valve when the re-application valve 40 rests against its seat in the support disk 42.

On the upper side of the re-application valve 40 three mutually connected radial grooves 63 serve the function of forming a passage for the brake fluid when valve 37 is in its normal open position.

A capped nut 68 is screwed onto the upper end of the valve 40 and is provided, on the one hand, with a space for the re-application valve 40 and the return spring 41 thereof and, on the other hand with a threaded connection for a brake fluid conduit. The capped nut 68 is sealed by O-rings against part 43 of the valve housing and the support disk 42.

As appears from FIG. 12, one valve 37 is connected to the master cylinder 3 and the other valve 38 to the wheel brake cylinder 5.

During normal braking, when the motor 10 and the solenoids 47 in valves 37, 38 are not actuated, the components occupy the positions shown in FIGS. 3 and 4 and brake fluid can freely flow from the master cylinder 3 through valve 37 and further through valve 38 to the brake cylinder 5.

Figure 6:
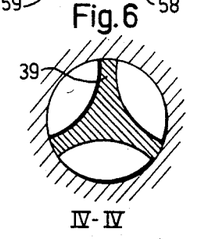

The following path is taken by the brake fluid through valve 37 and into the pumping chamber connected to piston 12. The brake fluid passes the re-application valve 40 which is lifted from its seat in the support disk 42 by operating pin 39. The brake fluid then flows through the opening between the hole in the support disk 42 and the operating pin 39 (compare FIG. 6), through the hole in the adjusting disk 60, through grooves 64 and 65 provided in core 52, and through the central hole in valve cone 59. The valve cone 59 is urged against its seat in insert 58 by the pressure differential caused by the flow of the brake fluid therethrough. Thereafter the brake fluid flows through the pumping chamber adjacent piston 12 and toward valve 38.

The path taken by the brake fluid through valve 38 toward brake cylinder 5 is identical with that described in the preceding paragraph apart from the fact that this valve has no re-application valve arrangement, so that the brake fluid is only required to pass through the holes in the support disk 61 and adjusting disk 60 to reach the grooves 64 and 65 in core 52.

When the brake is released and the brake fluid thus is to flow the brake cylinder 5 toward the master cylinder 3, the valve cones 59 are lifted from their seats in inserts 58, opening large through-flow areas to the brake fluid.

As the experts easily will realize, the system may be ventilated in a conventional way by means of the bleeding nipple in the wheel brake cylinder. The air follows the same path as the brake fluid during normal braking (i.e. from the master cylinder 3 through valve 37 and the space above piston 12, through valve 38 and from there to the wheel braking cylinder 5 and out into the atmosphere through the bleeding nipple thereof). The braking modulator therefore need not be provided with ventilating devices, and no routines need to be followed other than those which have been applied for decades in connection with conventional hydraulic brakes on motor vehicles. Thus, traditional ventilating routines are followed until the "pedal sponginess" characteristic of a badly ventilated braking system has been eliminated. Thereby also the braking modulator has been sufficiently ventilated to be able to come into action if needed. This simple and secure ventilating procedure is one of the advantages of the present invention as indicated in the introductory part of this specification.

From an appreciation of the way in which bleeding is performed, it will be obvious that the modulator of this invention may be mounted in any position without disadvantages for bleeding or other function which is an important advantage in modern vehicles where space is limited.

When a tendency towards wheel-locking is detected by the wheel sensor system 7, 8 (FIG. 12) current is supplied to motor 10 and the two solenoids 47 causing core 52 to move towards insert 58. The re-application valve 40 in valve 37 is thus closed after a movement of core 52 over a small portion of its total stroke length. Immediately thereafter valve disk 52 continues its movement to the stopped position against insert 58.

Under these circumstances valve disk 54 leaves the insert in core 52 and spring 53 urges valve disk 54 against valve cone 59 which thereby also is urged against its seat in insert 58. The process in valve 38 is identical apart from the fact that this valve lacks the re-application device.

The valves thus are conditioned for return-pumping of brake fluid from the wheel brake cylinder 5 back to the master cylinder 3, causing the brake fluid pressure in the wheel brake cylinder 5 to be diminished and the braking moment to be reduced.

As soon as at least one of the valves 37, 38 has been closed, additional pressure accumulation in wheel brake cylinder 5 is interrupted and when both valves 37, 38 have been closed and motor 10 operates and piston 12 oscillates, a complete piston pump has been obtained in which valve 38 forms the inlet valve through which brake fluid is sucked from the brake cylinder 5 when piston 12 moves inwardly towards the motor shaft, and valve 37 forms the outlet valve through which brake fluid is expelled toward the master cylinder 3 when piston 12 moves in the direction away from the motor shaft.

During the pumping process the valve disks 54 move together with the valve cones 59 as a unit. It should be noted that during the pumping process the re-application valve 40 also obviously moves in agreement with the valve disk 54 and the valve cone 59. This means that the relevant pumping valve area is the large surface at the seat in insert 58 and not the area, about twenty times less large, at the top of the valve cone 59. This value "twenty times less" refers to the relative dimensions which on the attached drawings have been given to the hole in the valve cone 59 and the valve seat in insert 58 and does not involve a constructive limit but indicates only a ratio which during practical tests appears to be suitable for such hydraulic braking systems as are used today. There is scarcely any upper limit. For example a ratio of 100 may be chosen instead.

Of course, the two valves 37 and 38 may change place, provided that their position in relation to the master cylinder 3 and the wheel brake cylinder 5 is maintained.

When the vehicle wheel has recovered from its locking tendency, causing the signal from the sensor system 7, 8 requiring release of the brake to cease, the braking modulator can be caused to execute various orders from the sensor system depending on the construction thereof.

Certain sensor systems emit only one signal, namely a signal ordering a release of the brake fluid pressure and thereby of the braking force. When the signal ceases the brake fluid pressure is again to be increased until the pressures on either side of the modulator have been completely equalized or until the sensor emits a new order regarding a reduction of the brake fluid pressure.

When the braking modulator is connected to such a sensor system as described in the preceding paragraph, the braking modulator operates in the following way. The control procedure starts by the emission of an order from the sensor system 7, 8 to reduce the braking force whereby a pumping down process is started as described earlier. When this sensor signal ceases, current supply to both solenoids 47 is interrupted. Also current supply to the motor may be interrupted but this is not necessary. This question will be taken up later on.

The return springs 53 then start to reposition the two cores 52 towards the starting or normal position. During the movement of the cores 52 towards the starting position, the valve disks 54 under the action of springs 55 move towards their abutments in cores 52 and are subsequently lifted off their seats in the valve cones 59 to expose the holes extending therethrough. This valve area is very small, and moderate forces from the return spring 53 are required also at high brake fluid pressure differentials in order to separate valve disk 54 from its seat in valve cone 59. However, valve cone 59 will remain in pressure contact with its seat in insert 58 due to the hydraulic pressure differential prevailing there.

While this question has been touched upon in the introductory part of the description, it may be correct to point out here also that the valve area between the valve cone 59 and its seat in insert 58 is so large that even a moderate pressure differential means that a large force would be required in order to lift the valve cones from their seats. It would require a very powerful spring 53 which in turn would require unreasonably large and thus slow acting solenoids 47.

The core 52 in valve 38 is not prevented from continuing its movement to the starting position, i.e. until it is urged by spring 53 via adjusting disk 60 against the support disk 61.

The course of action in valve 37 is the same except that core 52 is stopped in its movement toward the starting position by the fact that the return spring 53 is not able to open the re-application valve 40 because of a high pressure differential thereacross. However, the movement of the core is sufficient to cause the small hole in valve cone 59 to be exposed by valve disk 54.

The consequence is that the valve cone 59 during a braking process controlled by the modulator and the sensor system as a rule will be lifted from its seat in insert 58. Only rarely will the brake fluid pressure differential across the modulator become so low that this occurs during a controlled braking process.

Now brake fluid may flow from the master cylinder 3 and through both valves 37, 38 towards the wheel brake cylinder. However, due to the fact that the re-application valve 40 is held closed, the brake fluid flow will be strongly restricted as the only path to be taken by the brake fluid past the re-application valve 40 extends through the previously mentioned groove 62 in the seat surface thereof (see FIGS. 3, 4 and 7). In the absence of this restriction, control difficulties would be encountered and the pressure increase in the wheel brake cylinder 5 would be so violent that the system would operate in a particularly unpleasant and jerky way, while in addition this powerful pressure application would cause unacceptable loads to act on the vehicle suspension.

If the pressure equalization is permitted to continue until the differential has been reduced to some few bar, the re-application valve 40 will open permitting core 52 in valve 37 fully to return to the starting position under the action of return spring 53, fully opening valve 37.

If an order from the sensor system 7, 8 to reduce the brake fluid pressure should arrive during a pressure restoration or re-application process, solenoids 47 are again supplied with current and the valve systems, springs 55, valve disks 54, valves cones 59 and inserts 58 are again conditioned to perform their check valve function permitting a pump down phase according to the preceding description to be started.

However, there are more complicated sensor systems which in addition to the previously described pump down and re-application phases also contemplate phases during which a certain braking pressure is held constant. The braking modulator according to the present invention is designed also to execute such orders.

If current supply to the solenoid 47 of either valve 37, 38 is interrupted during a pump down phase, the hole in the corresponding valve cone 59 is exposed. Operation of the pump is then terminated because a heavy leakage has been brought about in its inlet valve. However, the other valve 37 remains closed causing the braking pressure to be frozen.

If the order to hold the pressure constant arrives during the re-application phase, a pressure-holding phase is produced in a similar way. One of valves 37, 38 is supplied with current.

From this description of the various functions of a modulator circuit for a wheel brake cylinder, it will be appreciated that a motor 10 may operate the pistons for several circuits. If for the sake of simplicity the modulator for two wheel braking cylinders illustrated in FIGS. 1, 2 and 8 is chosen, it will be seen that the motor will be permitted to run without affecting the pressure in the two wheel brake cylinders provided that none of the solenoids 47 in valves 37, 38 is supplied with current in any of the circuits of the modulator. There is simply no effective pump because all the valves 37, 38 are open and the fact that the motor 5 is in operation and the pistons 11, 12 are oscillating only results in a slight and quite ineffective fluctuation of the brake fluid pressure. Starting from the fact that motor 10 is rotating, the modulator is able to respond to arbitrary combinations of the four orders enumerated in the introduction of this specification. If current is supplied to solenoid 47 in one of the two valves 37, 38 included in the circuit, the accumulation of pressure in the wheel braking cylinder 5 is stopped. If current is supplied to solenoids 47 in both valves 37, 38 a reduction of the brake fluid pressure in the wheel brake cylinder is started. If thereafter the current supply to solenoid 47 in either valve 37, 38 is interrupted, the reduction of brake fluid pressure is interrupted and the pressure is held constant in the wheel brake cylinder 5. If thereafter the current supply is interrupted to solenoids 47 of both valves 37, 38, a pressure increase in the wheel brake cylinder 5 under the control of the re-application device 40 is started.

It may be mentioned that sensor systems sending signals involving orders to hold the brake fluid pressure constant, are in many cases so constructed that both the pressure reducing and the pressure re-application phases may have several interruptions during which the brake fluid pressure is to be held constant. The modulator according to the present invention is able to respond to such sensor orders.

Figure 14:
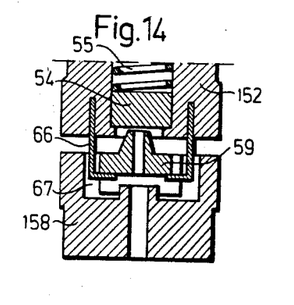
FIG. 14 illustrates an alternative embodiment of the valve arrangement according to FIGS. 3 and 4.

A modified form of valve arrangement is shown in FIG. 14 and will now be described. Two of the parts shown in FIG. 14 are slightly different from corresponding parts in other Figures, viz. the core 52 and the insert 58. For this reason these parts in FIG. 14 are designated as 152 and 158 respectively. The main purpose of the construction according to FIG. 14 is to hold the valve cone 59 lifted away from the seat in insert 158 during normal braking or bleeding when the modulator is not in action. This is accomplished by the provisions of hook-shaped elements 66, preferably three in number, anchored in the core 152 and adapted to be received in recesses 67 provided in insert 158. During normal braking brake fluid can pass in either direction, not only through the central hole in valve cone 59 but also past valve cone 59 and the seat in insert 158. The same applies for brake fluid mixed with air during ventilation.

This may be advantageous in certain installations, e.g. in connection with wheel brake cylinders which during braking require very large amounts of brake fluid or in connection with master cylinders 3 having very large internal air volumes which have to be expelled through the entire braking circuit when an initially completely empty system is to be filled with brake fluid. However, in normal cases the arrangement according to FIG. 14 is not required.

In FIG. 14 the parts are shown in the relative positions taken when the solenoid 47 is not energized. In this case valve cone 59 is held in a lifted position in insert 158 by means of the hook-shaped elements 66, no higher than necessary to leave a safe spacing between valve cone 59 and valve disk 54.

As for the rest, the arrangement according to FIG. 14 does not interfere with the function of valves 37, 38. When core 152 is completely pulled against insert 158, the portions of elements 66 which in FIG. 14 are shown to lift valve cone 59 from the seat in insert 158, are positioned completely below this seat and thus exert no function at all. In the re-application position, if a sufficiently high pressure differential is prevailing over valve cone 59, there is the difference that core 152 is prevented from returning to "normal position" by elements 66 because valve cone 59 is urged against the seat in insert 158 by the braking pressure differential.

In the basic embodiment in which the construction so far has been described, the core 52 is prevented from returning to "normal position" by the re-application valve 40 and the operating pin 39. In the construction according to FIG. 14, the core 152 is prevented from returning to "normal position" during a re-application phase by the valve cone 59 and the hook-shaped elements 66. It will be appreciated that the re-application function has not been changed if the arrangement shown in FIG. 14 is chosen instead of the basic embodiment.

It is another purpose of the construction according to FIG. 14 to reduce the actuation time of core 152 after the re-application phases during a braking process controlled by the modulator, and this is brought about by the fact that the core is prevented by the hook-shaped elements 66 from completely returning to its normal position. This means that the air gap between core 152 and insert 158 during a re-application phase is smaller than if the core 152 is permitted to return completely when current supply to solenoid 47 is interrupted. When current supply to solenoid 47 is subsequently started, core 152 is exposed to a considerably larger magnetic force than if the core 152 had been in its "normal position". In practical embodiments of the modulator according to the present invention, this difference in air gap width amounts to about 30% which is an important difference considering the known fact that the pulling force in a solenoid is substantially inversely proportional to the square of the air gap. With the 30% reduction of the air gap as indicated here almost a doubling of the pulling force is obtained which, together with the fact that the distance to be passed by core 152 to reach the fully attracted position also has been shortened by 30%, substantially halves the application time in comparison with the application time when the starting point of core 152 is the "normal position".

As the central hole in valve cone 59 may be made arbitrarily small by means of the arrangement according to FIG. 14, it will be appreciated that these holes may be construed to constitute the necessary restriction during the re-application phase. Thus, it may be possible to avoid inclusion of the structure which, as the function of this phase has been described so far, have performed this function, namely the valve seat in the support disk 42, the operating pin 39 and the re-application valve 40.

Practical considerations, primarily the risk of clogging, however, militate against excessively small holes in valve cone 59. For small, medium and large passenger cars the details enumerated in the preceding paragraph must be used in order to take care of the re-application function. For heavy passenger cars and in particular for heavy load-bearing vehicles and buses provided with hydraulic brakes, this simplification of valve 37 may be used to advantage.

A quick reaction to the orders of the sensor system 7, 8 is of extreme importance of the efficiency of the entire system. It is important that the motor 10 start quickly. If it appears that the motor of a modulator in a certain vehicle does not start sufficiently quickly, it is possible to start the motor, e.g. via the stop lamp switch of the braking system, as soon as braking is initiated so that the motor is ready in case the sensor system emits an order to reduce the brake fluid pressure. It is well-known that the stop lamp switch closes the current circuit at very low brake fluid pressures. If the motor is considered to be started unnecessarily often in this way, another pressure-sensitive switch may be introduced starting the motor (or motors, because a system for a complete motor car may comprise several modulators) at some higher brake fluid pressure which is still below a pressure at which no risk of wheel lock exists for most vehicles irrespective of how bad road conditions may be. In order to save current and not unnecessarily wear out the modulators, such a preparedness start may be performed via a suitable resistor.

One way of continuing operation of the motor during a braking process controlled by the modulator, even though the sensor system during such a process will at certain intervals of time interrupt the current supply to the motor, involves use of an electronic holding circuit (such as an RC-circuit) to continue current supply to the motor in spite of the fact that the sensor system has interrupted the current supply. This holding time does not have to be longer than the periods of time during a controlled braking process during which the motor current is interrupted, which normally is a question of some tenth of seconds.

It is also extremely essential that valves 37, 38 react very quickly to sensor signals both as far as attraction is concerned when current is supplied to solenoids 47 and after release when the supply of current to the solenoids has been interrupted. As a rule, no difficulties are encountered as far as quick attraction is concerned, as it is simply a question of providing sufficiently strong solenoids 47. More pronounced difficulties are encountered in causing cores 52 to be released when current supply is broken and, unfortunately, these difficulties become more pronounced the stronger is the magnetic flow produced by solenoids 47.

Figure 13:
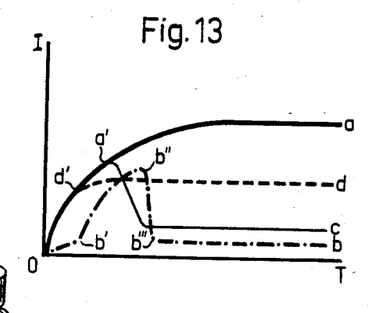
FIG. 13 is a amperage-time diagram for solenoid operating circuits.

Three variations of devices offering solutions for this problem shall be explained by reference to FIG. 13 showing amperage (I) as a function of time (T). The common feature of the three arrangements is that a very powerful solenoid 47 is used in which a very high amperage would be achieved if the chosen net voltage is permitted to act for a sufficiently long time. Such a process is shown by the thick full line (a) in FIG. 13.

One arrangement has a resistor in series with solenoids 47. The resistor is shunted by a transistor to short-circuit the resistor upon reception of a control signal. This control signal is derived from an induction coil wound on the same coil support 48 as solenoids 47. When current is supplied to solenoids 47, it passes during the first moments through the resistor. This is shown in FIG. 14 by a dot-and-dash line (0) to (b'). A control current is thus induced causing the transistor to short-circuit the resistor, after which time the solenoid 47 is exposed to full voltage causing the amperage to build up very quickly as shown in FIG. 13 by a dot-and-dash line (b') to (b"). When the current passing through the solenoid approaches a steady-state value, the time derivative of the amperage is reduced so that the induced control current is weakened to such an extent as to become unable to hold the transistor closed and the resistor is again inserted into the circuit. The current flow in the induction coil controlling the transistor is reduced, thus causing the transistor to become non-conductive and the resistor to be inserted again into the circuit. The current flow through solenoid 47 is then strongly reduced as shown by a dot-and-dash line (b") to (b'''), to continue on a constant level. The strength of the magnetic field produced by the solenoid quickly fades out a to level which is just sufficient to hold core 52 in the attracted position. It will be appreciated that core 52 under the action of spring 53 very quickly returns to its starting position when the current supply to the solenoid is interrupted. The great advantage of this arrangement in comparison with the two arrangements to be described hereafter resides in the fact that it performs a so-called sequence control in such a way that the restriction of the amperage does not take place before core 52, 152 actually has been pulled over its entire stroke-length.

Similar results may be obtained by electrical "solid-state" circuits controlled by commercially available electronic "chips". "Chips" are available which permit current to freely pass for a short, predetermined period of time. The evolution of the current follows the full line form (0) to (a'). After expiration of this period of time, in this connection some milliseconds, a "chopper" or oscillator included in the "chip" chops the current to form a pulsating direct current having a mean voltage determined by the intervals during which the circuit is respectively broken and closed. The current than goes down along the fine full line from (a') to (c') after which the amperage remains on a constant level. The pre-programmed period of time is so adapted that the core 52, 152, has been attracted before the current is restricted.

In certain fields of use of modulators a "chip" forming a current limiter may be sufficient. When the current supply to the solenoid is started, the current may pass unhampered until it approaches at (d') a predetermined amperage after which time the current is held constant at this amperage. The continued process is illustrated by the broken line (d). The predetermined amperage is so adapted that the core 52, 152, has been attracted prior to the restriction of the current.

It will appear from the preceding explanation that this invention has a very wide applicability. The drawbacks observed in previously known systems are completely eliminated.

In the drawings and specifications there has been set forth a preferred embodiment of the invention and, although specific terms are used, the description thus given uses terminology in a generic and descriptive sense only and not for purposes of limitation.

What we claim is:

1. In a brake modulator for use in fluid pressure brake systems and adapted to be inserted into a brake fluid conduit between a brake fluid pressure generator and a wheel braking cylinder and to be controlled by a sensor system, the modulator having first and second conduit coupling means for interposition of the modulator in the conduit, first and second valve means in series flow relation with each other and with the conduit coupling means for controlling fluid flow and defining a controlled conduit portion, valve actuator means operatively coupled to the valve means for normally conditioning the valve means for free passage of fluid through the modulator and controllably operable for conditioning the valve means for blocking passage of fluid through the modulator, and means operatively communicating with the controlled conduit portion for cyclically expanding and contracting the volume thereof and thereby for cooperating with the valve means in pumping fluid through the modulator, those improvements in the valve means and valve actuator means which facilitate enhanced operation of the modulator and which comprise each of said valve means having secondary valve means for enlarged volume flow and primary valve means for restricted volume flow and mounted adjacent to and seated in the corresponding one of said secondary valve means, and said valve actuator means having first and second electromagnetic means for operating corresponding ones of said first and second valve means, said electromagnetic means being capable of functioning independently one of the other and each being mounted adjacent to the corresponding one of said valve means and to the same side of said secondary valve means as the associated primary valve means.

2. A brake modulator as claimed in claim 1, wherein said valve means are so positioned in relation to each other and to the controlled conduit portion that the controlled conduit portion forms a portion of the brake fluid conduit through the modulator.

3. A brake modulator as claimed in claim 1 or 2, wherein said electromagnetic means comprises a plurality of solenoids.

4. A brake modulator as claimed in claim 3 wherein each of said solenoids comprises a core and a return spring positioned over said core and further wherein said spring is effective for exerting a force only sufficient to separate said primary valve means from their seat in said secondary valve means.

5. A brake modulator as claimed in claim 4 wherein said core has hook elements for limiting the extent of movement of said secondary valve means relative to said core.

6. A brake modulator as claimed in claim 3 wherein each of said solenoids has a winding dimensioned for high steady state amperage upon a predetermined voltage being applied and further wherein electrical circuit means are electrically connected to said windings for controlling current flow therethrough upon energization of said solenoids.

7. A brake modulator as claimed in claim 6 wherein said electrical circuit means comprises a resistor electrically connected in series with a corresponding one of said windings and a control transistor shunting said resistor for controllably short-circuiting said resistor, said transistor being electrically connected for receiving a control current from an induction coil wound in common with said corresponding winding.

8. A brake modulator as claimed in claim 6 wherein said electrical circuit means comprises timing means electrically connected in series with said winding and effective after a predetermined interval of conductance for converting current through said winding into a pulsating direct current having a mean voltage which limits the current through said winding to a predetermined value.

9. A brake modulator as claimed in claim 6 wherein said electrical circuit means comprises current limiting means electrically connected in series with said winding and effective, after a certain predetermined amperage has been reached, to limit any increase in current.

10. A brake modulator as claimed in claim 1 wherein at least one of said valve means further has reapplication check valve means operatively responsive to the corresponding one of said electromagnetic means and to fluid flow therethrough for imposing a first restriction to flow therethrough in the absence of energization of said electromagnetic means and for imposing a second, greater restriction to flow therethrough upon energization of said electromagnetic means.

11. A brake modulator as claimed in claim 1 and further comprising a plurality of sets of conduit coupling means and valve means, said plurality of sets of valve means defining a corresponding plurality of sets of controlled conduit portions and further wherein said means for cyclically expanding and contracting the volumes of said controlled conduit portions comprises a single electrical drive motor and a plurality of sets of pistons driven by said drive motor, said pistons functioning with corresponding sets of said valve means for pumping fluid in a corresponding plurality of brake circuits.

12. A brake modulator as claimed in claim 11 wherein each of pistons has a predetermined stroke volume and further wherein certain of said pistons have stroke volumes differing from others of said pistons.

13. A brake modulator as claimed in one of claims 11 or 12 further comprising an oscillating common eccentric for driving said pistons, and further wherein said eccentric and the ends of said pistons facing said eccentric have spherical depressions, said modulator further comprising a ball with a radius less than the radius of the spherical depressions placed in the spherical depressions between each piston and the eccentric.

14. In a brake system for braking a rotating member which has fluid pressure actuated brakes for braking rotation of the member, reservoir means for supplying fluid to the cylinder means, conduit means for establishing operative communication between the cylinder and the reservoir means, sensor means for detecting the rate of retardation of rotation of the braked member and for signalling the occurrence of a rate of retardation in excess of a predetermined rate, and a brake modulator inserted into the conduit means between the reservoir and the cylinder and controlled by the sensor means, the modulator having first and second conduit coupling means for interposition of the modulator in the conduit, first and second valve means in series flow relation with each other and with the conduit coupling means for controlling fluid flow and defining a controlled conduit portion, valve actuator means operatively coupled to the valve means for normally conditioning the valve means for free passage of fluid through the modulator and controllably operable for conditioning the valve means for blocking passage of fluid through the modulator, and means operatively communicating with the controlled conduit portion for cyclically expanding and contracting the volume thereof and thereby for cooperating with the valve means in pumping fluid through the modulator, those improvements in the valve means and valve actuator means which facilitate enhanced operation of the modulator and which comprise each of said valve means having secondary valve means for enlarged volume flow and primary valve means for restricted volume flow and mounted adjacent to and seated in the corresponding one of said secondary valve means, and said valve actuator means having first and second electromagnetic means for operating corresponding ones of said first and second valve means, said electromagnetic means being capable of functioning independently one of the other and each being mounted adjacent to the corresponding one of said valve means and to the same side of said secondary valve means as the associated primary valve means.

15. A brake system as claimed in claim 14 wherein the sensor means controls electrical current supply to said electromagnetic means of both said valve means for simultaneous operation of said valve means.

16. A brake system as claimed in claim 14 wherein the sensor means controls electrical current supply to said electromagnetic means of both said valve means for separate operation of either one of said valve means.

17. A brake system as claimed in claim 14 wherein said means for cyclically expanding and contracting the volume of said controlled conduit portion comprises a plurality of pistons and an electrical drive motor for oscillating said pistons, and further comprising electrical switch means electrically connected to said motor for controlling the energization thereof and operatively response to fluid pressure in said conduit means for energizing said motor in the presence of an elevated fluid pressure indicative of the application of braking force.

18. A brake system as claimed in claim 14 wherein said means for cyclically expanding and contracting the volume of said controlled conduit portion comprises a plurality of pistons and an electrical drive motor for oscillating said pistons, and further comprising an electrical circuit means electrically connected to said sensor means and said motor for continuing energization of said motor for a short time subsequent to said sensor means having transmitted an order to terminate a pump down phase in a controlled braking process.

* * * * *